United States Patent
Mani et al.

(10) Patent No.: US 10,942,637 B2
(45) Date of Patent: Mar. 9, 2021

(54) METHOD AND SYSTEM FOR PROVIDING CONTROL USER INTERFACES FOR HOME APPLIANCES

(71) Applicant: MIDEA GROUP CO., LTD., Foshan (CN)

(72) Inventors: Suresh Mani, San Jose, CA (US); Yi Fan, San Jose, CA (US); Zhicai Ou, San Jose, CA (US)

(73) Assignee: MIDEA GROUP CO., LTD., Foshan (CN)

( * ) Notice: Subject to any disclaimer, the term of this patent is extended or adjusted under 35 U.S.C. 154(b) by 144 days.

(21) Appl. No.: 16/155,684

(22) Filed: Oct. 9, 2018

(65) Prior Publication Data
US 2020/0110532 A1 Apr. 9, 2020

(51) Int. Cl.
| | |
|---|---|
| G06F 3/048 | (2013.01) |
| G06F 3/0484 | (2013.01) |
| G06K 9/00 | (2006.01) |
| G05B 15/02 | (2006.01) |
| H04N 5/232 | (2006.01) |

(52) U.S. Cl.
CPC ......... *G06F 3/04847* (2013.01); *G05B 15/02* (2013.01); *G06K 9/00268* (2013.01); *G06K 9/00288* (2013.01); *H04N 5/232* (2013.01); *G06K 9/00375* (2013.01); *G06K 2009/00322* (2013.01)

(58) Field of Classification Search
CPC .............. G06F 3/167; G06F 16/951; G06F 2203/0381; G06F 3/012; G06F 3/04847; G10L 17/00; G05B 15/02; G06K 9/00268; G06K 9/00288; G06K 9/00375; G06K 2009/00322; H04N 5/232
See application file for complete search history.

(56) References Cited

U.S. PATENT DOCUMENTS

| | | | |
|---|---|---|---|
| 9,916,503 B2 * | 3/2018 | Cho ........................ | A61B 3/145 |
| 10,559,302 B2 * | 2/2020 | Beifuss ................... | G06F 3/017 |

(Continued)

FOREIGN PATENT DOCUMENTS

| | | |
|---|---|---|
| CN | 107255928 A | 10/2017 |
| EP | 3312766 A2 | 4/2018 |

OTHER PUBLICATIONS

Midea Group Co. Inc., International Search Report and Written Opinion, PCT/CN2019/078510, dated Jul. 10, 2019, 10 pgs.

*Primary Examiner* — Wilson W Tsui
(74) *Attorney, Agent, or Firm* — Morgan, Lewis & Bockius LLP (57) ABSTRACT

A method and system of providing a control user interface at a first home appliance are disclosed, the method including detecting presence of a user within a threshold range of the first home appliance, and performing image processing on one or more real-time images of the user to determine one or more characteristics of a facial image of the user; determining at least a first parameter that is configured to trigger a first change in a current control user interface configuration for the first home appliance; and activating a first control user interface configuration corresponding to the first parameter for the first home appliance while the presence of the first user continues to be detected within the threshold range of the first home appliance.

17 Claims, 5 Drawing Sheets

(56) References Cited

U.S. PATENT DOCUMENTS

| | | | |
|---|---|---|---|
| 2009/0133051 A1* | 5/2009 | Hildreth | H04N 21/4223 725/28 |
| 2014/0157209 A1* | 6/2014 | Dalal | G06K 9/00355 715/863 |
| 2015/0016733 A1* | 1/2015 | Park | G06K 9/033 382/218 |
| 2015/0351581 A1* | 12/2015 | Li | A47J 31/4403 426/231 |
| 2016/0026782 A1* | 1/2016 | Smowton | H04L 9/3231 726/19 |
| 2016/0077793 A1* | 3/2016 | Disano | G06F 3/167 715/728 |
| 2016/0358443 A1* | 12/2016 | True | G08B 25/08 |
| 2017/0004828 A1* | 1/2017 | Lee | G10L 15/25 |
| 2017/0208604 A1 | 7/2017 | Kuo | |
| 2018/0096212 A1 | 4/2018 | Lin | |
| 2019/0086890 A1* | 3/2019 | Bradley | B05B 1/185 |
| 2019/0369577 A1* | 12/2019 | Kim | G10L 15/00 |

* cited by examiner

METHOD AND SYSTEM FOR PROVIDING CONTROL USER INTERFACES FOR HOME APPLIANCES

FIELD OF THE TECHNOLOGY

The present disclosure relates to the field of appliance control, and in particular, to a method and system for providing user interfaces for home appliances.

BACKGROUND OF THE TECHNOLOGY

Home appliances provide various dedicated functions to home users. Each appliance has its own control user interface that is operable via various input modalities, and each appliance provides feedback to the user via various output modalities. User interface design for home appliances is critical in affecting the usage efficiency and user experience when interacting with the home appliances.

In a household, different users may have different abilities and needs, and would benefit from accessibility enhancement features that are tailored to their particular accessibility needs. Conventionally, a user may turn on and off a particular accessibility enhancement feature of a home appliance using a settings user interface of the home appliance. For example, a vision-impaired user can turn on a voice-over feature, to operate a control panel of an appliance by pressing on one or two buttons and hearing the functions read out loud one by one before selecting one of the functions.

In some cases, certain functions of the appliances are not safe to operate by some members of the household, and access restrictions for those functions can be turned on using a settings user interface of the home appliance. For example, a passcode system can be used to prevent access to certain functions of an appliance from users who are not given the passcode.

SUMMARY

As discussed in the background, a conventional way of providing accessibility enhancement and/or function restrictions require the accessibility to be turned on or off through user's deliberate actions in a settings user interface. This approach is inconvenient and cumbersome. For example, to turn-on an accessibility enhancement feature, the user has to fumble with the settings user interface without the aid of the desired accessibility enhancement, which is time consuming and near impossible sometimes for a disabled user. Furthermore, once the accessibility enhancement is turned on, it will stay on until it is explicitly turned off using the settings user interface again. Since the accessibility enhancement is usually tailored for a particular impairment or disability type, other users who do not share such impairment or disability will find the accessibility enhancement to be particularly annoying and difficult to use. Turning off the accessibility enhancement manually also would be time consuming and irritating for these users who do not share the same impairment or disability. It would be near impossible for a user with a different impairment or different accessibility enhancement needs to turn off the previously turned on accessibility enhancement through the settings user interface of the appliance.

In a multi-member household or a public appliance-sharing location (e.g., a public laundry mart), different people with different abilities, operation preferences, and accessibility enhancement needs, would benefit a dynamic, user-friendly, and versatile way to automatically adjusting the accessibility enhancements that are provided to an appliance. In the present disclosure, various features are obtained from a user's facial images when the user is detected within a vicinity of an appliance. For example, the user interface configuration of the appliance, including which accessibility enhancement is turned on or off, the appearance of the graphical user interface, the primary modality of the user input accepted by the appliance, the primary modality of the feedback provided to the user by the appliance, etc., is adjusted automatically, without direct user intervention through the current user interface of the appliance, based on the parameter(s) extracted and deduced from the user's facial images captured at the present time. In some cases, the facial features are part of the user's appearance, and do not change drastically from day to day. In some cases, the user can through simple actions, modify the facial features detected by the image processing system of the appliance, to easily, intuitively, and quickly modify the user interface configuration of the appliance, on the fly, without direct interaction with the appliance using the current user interface configuration of the appliance. As disclosed herein, by analyzing the user's facial features, including the user's age, identity, presence or absence of facial accessories, presence of blockage of certain facial features (e.g., hand or finger blocking eye, ear, nose, mouth regions of the face, etc.), the user's intentions and needs for accessibility enhancements can be determined on the fly. This allows the appliance to automatically and seamlessly switch between the desired user interface configuration for multiple users with different needs without undue burden on the users. This also allows users whose profiles are not stored by the appliance to quickly activate a desired user interface configuration on the appliance.

As discussed in the background section. Sometimes, different function and/or access restriction is needed for different members of a household. Conventionally, a child-lock or passcode system require the parents to implement the lock or passcode, and the passcode is easily leaked or forgotten, rendering the lock useless or locking out people who should have access to the functions.

As disclosed herein, by analyzing the user's facial features, including the user's age and/or identity, presence and identity of another user nearby, different access restrictions can be quickly activated or deactivated. For example, an eldest child who tends to overeat is not permitted to unlock the refrigerator in the absence of an adult nearby, but is permitted to access the refrigerator is an adult is nearby. According to the method disclosed herein, the presence and identity of the child is determined from the facial image analysis of the child, and in addition, the presence of an adult is detected based on facial analysis of other faces in the image. Access to the refrigerator is granted to the child if the child attempts to open the refrigerator in the presence of the adult, and denied if the child attempts to open the refrigerator in the absence of the adult.

The embodiments disclosed herein utilize computer vision and local intelligent decision-making to address at least some of the shortcomings of the conventional ways of providing a control user interface for home appliances.

As disclosed herein, in some embodiments, a method of providing a control user interface at a first home appliance, comprising: at a computing system having one or more processors and memory: detecting, via one or more cameras that are collocated with the first home appliance, presence of a first user within a first threshold range of the first home appliance; in response to detecting the presence of the first user within the first threshold range of the first home appliance, performing image processing on one or more images of the first user that are captured by the one or more cameras to determine one or more characteristics of a facial image of the first user in one or more images; in accordance with the one or more characteristics of the facial image of the first user that are determined from the one or more images captured by the one or more cameras, determining at least a first parameter that is configured to trigger a first change in a current control user interface configuration for the first home appliance; and activating a first control user interface configuration corresponding to the first parameter for the first home appliance while the presence of the first user continues to be detected within the first threshold range of the first home appliance.

In some embodiments, a first home appliance includes one or more cameras, an appliance function unit, one or more processors, and memory storing instructions, the instructions, when executed by the one or more processors, cause the processors to perform any of the methods described herein. In accordance with some embodiments, an electronic device includes one or more processors, and memory storing one or more programs; the one or more programs are configured to be executed by the one or more processors and the one or more programs include instructions for performing or causing performance of the operations of any of the methods described herein. In accordance with some embodiments, a computer readable storage medium has stored therein instructions, which, when executed by an electronic device, cause the device to perform or cause performance of the operations of any of the methods described herein. In accordance with some embodiments, an electronic device includes: means for capturing images, means for performing house appliance operations, and means for performing or causing performance of the operations of any of the methods described herein.

Various advantages of the present application are apparent in light of the descriptions below.

BRIEF DESCRIPTION OF THE DRAWINGS

The aforementioned features and advantages of the disclosed technology as well as additional features and advantages thereof will be more clearly understood hereinafter as a result of a detailed description of preferred embodiments when taken in conjunction with the drawings.

To describe the technical solutions in the embodiments of the present disclosed technology or in the prior art more clearly, the following briefly introduces the accompanying drawings required for describing the embodiments or the prior art. Apparently, the accompanying drawings in the following description show merely some embodiments of the present disclosed technology, and persons of ordinary skill in the art may still derive other drawings from these accompanying drawings without creative efforts.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

The following clearly and completely describes the technical solutions in the embodiments of the present application with reference to the accompanying drawings in the embodiments of the present application. Apparently, the described embodiments are merely a part rather than all of the embodiments of the present application. All other embodiments obtained by persons of ordinary skill in the art based on the embodiments of the present application without creative efforts shall fall within the protection scope of the present application.

Figure 1:
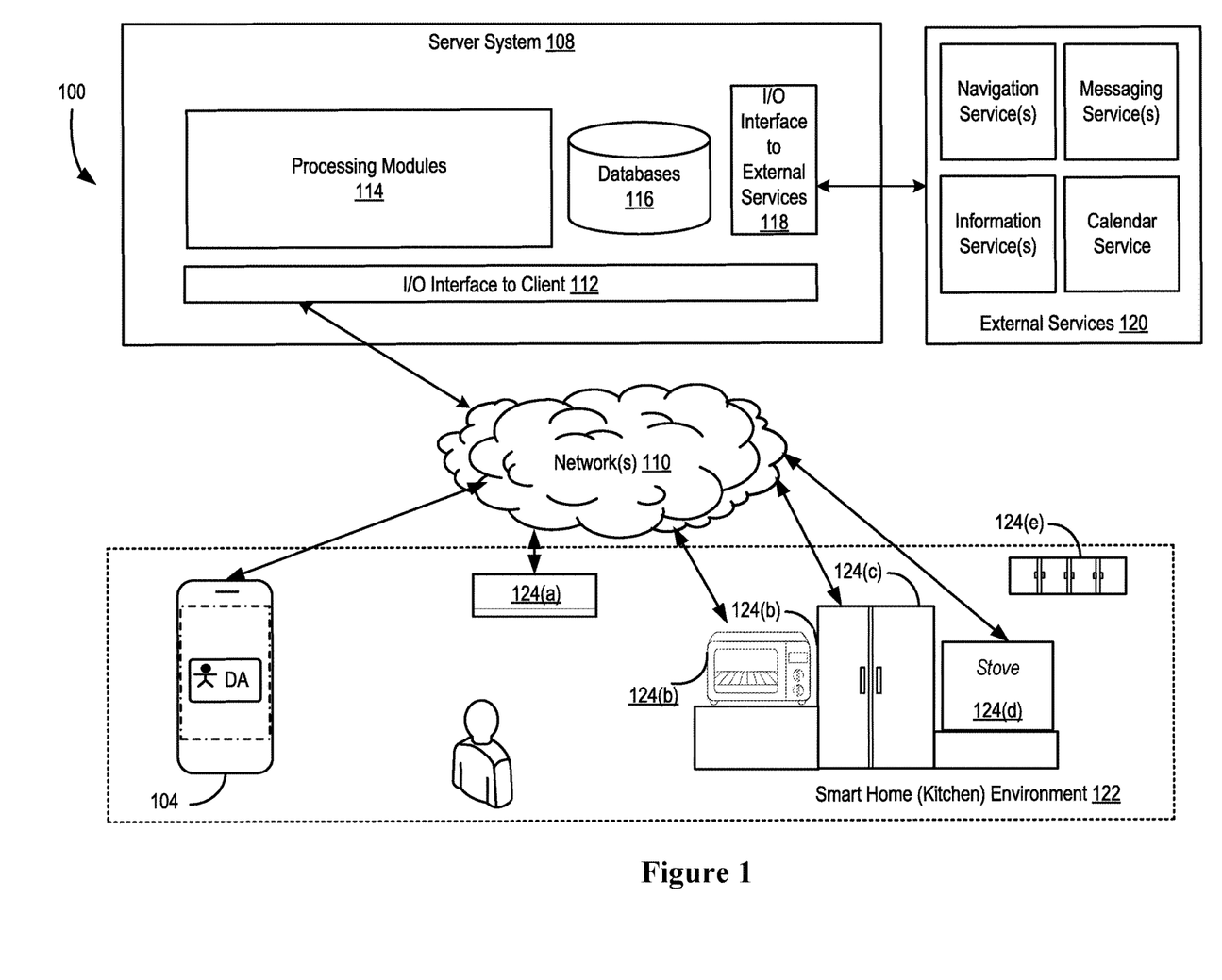
FIG. 1 is a block diagram illustrating an operating environment of one or more home appliances in accordance with some embodiments.

FIG. 1 is a block diagram illustrating an operating environment 100 of one or more home appliances in accordance with some embodiments.

The operating environment 100 is optionally implemented according to a client-server model. The operating environment 100 includes a smart home environment 122 (e.g., a smart kitchen of the smart home environment is shown in FIG. 1) and a server system 108 communicatively coupled with the smart home environment 122 via cloud networks 110. In some embodiments, the smart home environment 122 includes one or more smart home appliances 124. Examples of the smart home appliances 124 include refrigerators 124(c), microwave ovens 124(b), smart stoves 124(d), smart storage cabinets 124(e), smart air conditioner 124(a), smart entertainment center, etc. In some embodiments, the client-side environment 100 further includes a user device 104 (e.g., a smartphone, a tablet, a personal computer, or a central communication hub).

As an example, the smart home environment includes a first home appliance, e.g., a smart air conditioner 124(a) that is located on a wall of the kitchen near the ceiling. The smart home environment further includes a second home appliance, e.g., a refrigerator 124(c), that is located between two other smart home appliances, e.g., smart oven 124(d) and smart microwave oven 124(b), all of the three appliances are placed against a wall of the kitchen opposite the air conditioner 124(a).

In some embodiments, a respective appliance of the one or more appliances 124 includes an input/output user interface. The input/output user interface optionally includes one or more output devices that enable presentation of media content, including one or more speakers and/or one or more visual displays. The input/output user interface also optionally includes one or more input devices, including user interface components that facilitate user input, such as a keypad, a voice-command input unit or microphone, a touch screen display, a touch-sensitive input pad, a gesture capturing camera, or other input buttons or controls.

In some embodiments, a respective appliance of the one or more appliances 124 further includes sensors, which senses environment information of the respective appliance. Sensors include but are not limited to one or more light sensors, cameras (also referred to as image sensors), humidity sensors, temperature sensors, motion sensors, weight sensors, spectrometers, infrared sensors, and other sensors. In some embodiments, the sensors associated with various appliances are used to provide user presence information (e.g., location of the user in the room, and which appliance(s) that the user is currently interacting with, etc.). In some embodiments, the sensors also provide information on the indoor environment, such as temperature, time of day, lighting, noise level, activity level of the room. This environment information can further be used to select suitable user interface configuration for an appliance, in addition to the facial features of the user that is present in front of the appliance.

In some embodiments, one or more devices and/or appliances in the kitchen area includes a respective camera and a respective motion sensor to detect presence of a user and captures facial images of the user. The user can move about the smart kitchen environment, and multiple devices 124 that are located in the vicinity of the user can capture the user's facial images, and independently transmit the images to the server system 108 through their own communication channels to the server.

In some embodiments, the server system 108 includes one or more processing modules 114, data and models 116, an I/O interface to client 112, and an I/O interface to external services 118. The client-facing I/O interface 112 facilitates the client-facing input and output processing for the server system 108. For example, the server optionally provides the image processing services for a particular appliance based on the images submitted by the appliance. The database and models 116 include various user data for each user and/or household of users, such as individual user's account data (e.g., images, age, gender, characteristics, etc.), and user interface configuration preferences and restrictions, etc. The one or more processing modules 114 utilize the data and models 116 to monitor presence of users and on-the-fly changes to user's facial features to determine a suitable user interface configuration for the appliance with which the user is about to interact.

In some embodiments, the server system 108 also communicates with external services 120 (e.g., navigation service(s), messaging service(s), information service(s), calendar services, home appliance control service(s), social networking service(s), etc.) through the network(s) 110 for task completion or information acquisition. The I/O interface to the external services 118 facilitates such communications.

In some embodiments, the server system 108 can be implemented on at least one data processing apparatus and/or a distributed network of computers. In some embodiments, the server system 108 also employs various virtual devices and/or services of third party service providers (e.g., third-party cloud service providers) to provide the underlying computing resources and/or infrastructure resources of the server system 108.

Examples of the communication network(s) 110 include local area networks (LAN) and wide area networks (WAN), e.g., the Internet. The communication network(s) 110 may be implemented using any known network protocol, including various wired or wireless protocols, such as Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

In some embodiments, the image processing functions and user interface configuration adjustment functions disclosed herein are provided remotely by the server 108, or locally by the smart appliances, and/or jointly through a cooperation between the server and the appliances, as described herein.

Figure 2:
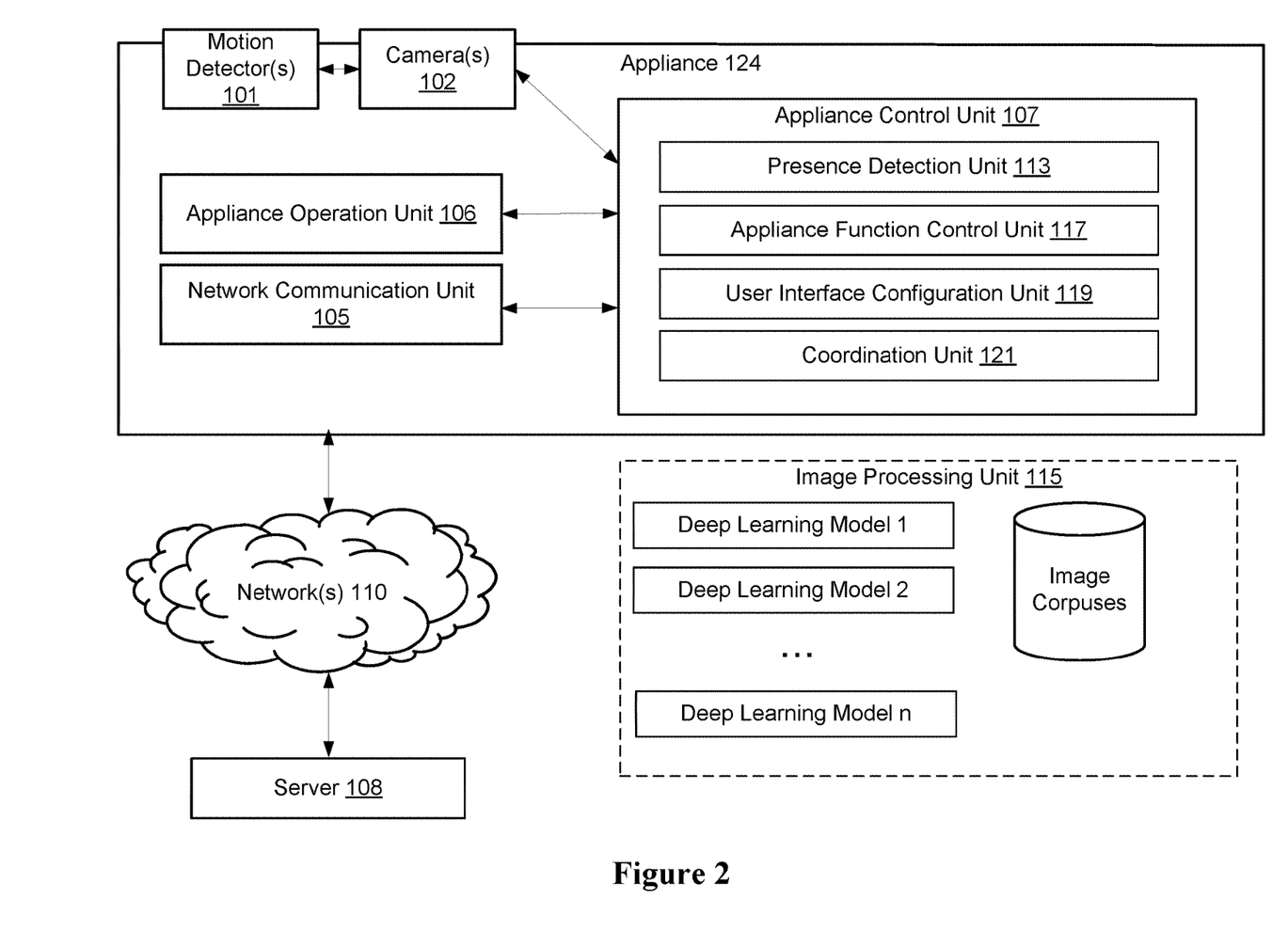
FIG. 2 is a block diagram of an exemplary home appliance in accordance with some embodiments.

As shown in FIG. 2, an exemplary smart appliance 124 (e.g., smart air conditioner 124(a), smart refrigerator 124(c), smart oven 124(d), or smart microwave oven 124(b)) includes one or more presence sensors, such as one or more motion detectors 101 and one or more onboard cameras 102, an appliance control unit 107, and an appliance operation unit 106. In some embodiments, the appliance 124 further includes a network communication unit 105 that communicates with a remote server 108 via one or more networks 110 (e.g., a local area network (LAN), a wide area network (WAN), and/or the Internet). In some embodiments, the appliance control unit 107 further includes presence detection unit 113 for controlling the one or more motion detectors 101 and the one or more cameras 102 to detect presence of a user in the vicinity of the appliance 124 and capturing images of the user upon detection presence of the user satisfying preset criteria. In some embodiments, the appliance control unit 107 further includes an appliance function control unit 117 for controlling the appliance operation unit 106. In some embodiments, the appliance control unit 107 further includes a user interface configuration adjustment unit 119 for providing real-time and on-the-fly adjustment of user interface configuration for the appliance 124 based on parameters deduced from image analysis of the user's facial images. In some embodiments, the appliance control unit 107 further includes a coordination unit that coordinates the presence detection, image capturing, user interface configuration (e.g., including adjusting accessibility enhancement features, and function restrictions) functions of appliances that are associated with one another, or physically near one another, such that the result of the detection, image capturing, analysis, and conclusions of the multiple appliances may be shared and coordinated to reduce power usage, improve analysis accuracy, reducing response time, and improving overall user experience when interacting with multiple appliances in the same room around the same time.

In some embodiments, the appliance control unit 107 further includes an image processing unit 115 which includes a plurality of machine learning models for analyzing the images from the one or more cameras 102, and provide parameters deduced from the image analysis performed on the images, such as the age, gender, identity, presence and/or absence of facial accessories, presence and/or absence of the user's hands blocking various parts of the user's face (e.g., whole hand or finger(s) blocking the eye region, nose region, ear region, and/or mouth region of the facial images). In some embodiments, the image processing unit 115 optionally include some components locally at the appliance 124, and some components remotely at the server 108. In some embodiments, the image processing unit 115 is entirely located on the server 108.

In some embodiments, the appliance 124 includes a mechanism for moving and focusing the cameras onto a user's face after the user's presence is detected. For example, the appliance includes a mounting bracket for the cameras that is controlled by one or more motors and actuators, and can change an orientation of the camera(s) (e.g., the tilt and yaw of the camera) relative to the detected user.

In some embodiments, a single camera is placed on the front side of the appliance (e.g., near the center of the upper or lower edge of the front side of the appliance's enclosure). In some embodiments, the camera is mounted on a platform with one or more actuators that are controlled (e.g., controlled via a remote control operated by a user, or controlled automatically by the appliance control unit 104) to change an orientation and/or location of the camera (e.g., by changing the tilt and yaw of the plane of the front-side of the camera, or anchor position of the camera) relative to a reference point (e.g., a fixed point on the front side of the appliance), to provide stereo imaging capability to the appliance 124. In some embodiments, two cameras are placed at two opposing corners of the appliance (e.g., in proximity to the two upper corners of the front side of the enclosure of the appliance, in proximity to the two opposing corners along a diagonal of the front side of the enclosure, etc.) to provide stereo imaging capability to the appliance. In some embodiments, cameras of two appliances that are placed side by side are used to provide stereo image capability to the appliance.

In some embodiments, the camera(s) 102 included on the air conditioner include image sensors for different wavelengths and/or intensities, such as infrared sensors, visible light sensors, night-vision sensors, and/or motion sensors, etc. In some embodiments, the cameras are operated on a continuous basis and produce continuous streams of image frames. In some embodiments, some cameras (e.g., infrared camera or low-light camera) are activated to capture images when one or more predefined events have been detected in the images captured by other cameras (e.g., visible light camera, etc.). For example, in some embodiments, when the ambient environment is low light (e.g., night), the night-vision camera is only activated to capture an image in response to a detection of a predefined motion event (e.g., more than a threshold amount of movement (e.g., intermittent movements less than x minutes apart) of a heat producing object (e.g., a person) for more than a predefined threshold amount of time (e.g., for more than 5 minutes)) by the infrared camera. In some embodiments, in addition to requiring presence of the user, the appliance also requires detection of the user's motion (e.g., approaching of the user toward the appliance), in order to trigger the image processing. For example, if the user simply enters the kitchen and sat down at the counter to eat a meal, the image capturing and user interface reconfiguration capabilities of the kitchen appliances do not need to be activated in response to mere detection of the user's presence near the kitchen appliances.

In some embodiments, appliance 124 includes a user interface 123, the user interface includes input devices of various modalities (e.g., keyboard, touch-screen, microphone, levers, knobs, buttons, camera for capturing motion gestures, haptic interface, etc.) and output devices of various modalities (e.g., displays, speakers, haptic output generators, sirens, lights, indicators, etc.). In some embodiments, the user interface 123 is controlled by user interface configuration adjustment unit 119 to receive user inputs (e.g., selection, activation, command, etc.) and deliver outputs (e.g., information, content, feedback to inputs, alerts, warnings, etc.) to the user.

In some embodiments, the appliance operation unit 107 includes various hardware mechanisms and components for performing the native functions of the appliance (e.g., for an air conditioner, the components include a compressor, refrigerant, an evaporator, a condenser, an expansion valve, fans, air filters, one or more sensors (e.g., a thermostat, a humidity sensor, an air flow sensor, valve pressure sensors, timers, etc.)).

In some embodiments, the appliance control unit 107 includes one or more processors, and memory. The memory stores instructions which when executed by the one or more processors, cause the processors to perform functions described herein to provide controls to the native functions of the appliance, detecting presence and intent of users in the vicinity of the appliance, determining the user's facial features based on user's facial images captured near the appliance, controlling user interface configuration of the user interface 123, coordinating the above functions among multiple appliances in the same vicinity.

In some embodiments, the appliance control unit 107 includes presence detection unit 113. The presence detection unit 113 receives input from motion detectors 101 and determines the distance of a user detected by the motion detector and whether the user movement is toward or away from the appliance based on the output of the motion detector 101. For example, if the motion detector 101 continues to detect motion, and the motion persists within the detection range of the motion detector for at least a threshold amount of time (e.g., 20 seconds), the presence detection unit 113 activates the cameras (102) to start capturing the images in the vicinity of the appliance 124. In some embodiments, the threshold distance of the user for triggering the cameras is the same as the motion detection range of the motion detectors 101. In some embodiments, two motion detectors placed at different locations on the appliance 124, or motion detectors shared by two or more appliances and are located separately on the two or more appliances are used determine the distance and the heading direction of the user detected within the detection range of the motion detectors. In some embodiments, once presence of the user is detected, and image capturing by the cameras 102 is started, the appliance control unit 107 sends the captured images, or portions of the captured images to the image processing unit 115 for face detection and/or facial feature analysis.

In some embodiments, the image processing unit 115 has a local component at the appliance and a remote component residing on a remote server. In some embodiments, the image processing that is performed locally can be relatively rudimentary with relatively limited on-board processing capabilities of the appliance 124. For example, the images may be used for face detection only. In some embodiments, the images are binarized and the user's outline is identified from the binarized images using various existing edge detection techniques. In some embodiments, the local component of the image processing unit extracts a portion of the captured images, and normalize the images such that only the images of the head portion of the user is retained and sent to the remote component residing on the remote server. In some embodiments, the server includes a plurality of deep learning models for extracting and characterizing features of the facial images. Each of the deep learning models is trained to recognize features corresponding to a respective parameter that is used to modify the user interface configuration of the appliance. In some embodiments, different machine learning models are used to process the images to recognize different features and the features in combination are used to determine how to modify the user interface configuration of the appliance.

For example, different machine learning models are used process the facial images to recognize different portions of the face and/or presence of facial accessories. For example, a first model is used to recognize the eye portion of the face, a second model is used to recognize nose portion of the face, a third model is used to recognize a mouth portion of the face, a fourth model is used to recognize an ear portion of the face, a sixth model is used to recognize a firsthand posture (e.g., open hand, back of hand facing out), a seventh model is used to recognize a second hand posture (e.g., fist, back of hand facing out), an eight model is used to recognize a third hand posture (e.g., closed hand, with index finger out). Once these portions of the face are recognized, the relative location of the different portions of the face and the location of the hand (if detected) are determined, to generate a facial feature parameter. In some embodiments, additional models are trained to deduce the use's age and identity based on the face images.

In some embodiments, training of the models can be performed on the server initially, and the trained models are transmitted to the appliance 124 after some time such that the image processing unit 115 performs the image analysis locally for newly captured images. This can reduce server load, and improve privacy protection for the user.

In some embodiments, based on the result of the image analysis, the user interface configuration unit 119 determines whether the current user interface configuration needs to be modified to accommodate the user's needs. For example, the user interface configuration unit 119 optionally turns on or off one or more accessibility enhancement features of the appliance, changes the user interface layout of the appliance, restrict access to one or more functions of the appliance, or enabling access to one or more functions of the appliance based on the parameters generated by the image processing unit 115.

In some embodiments, the appliance control unit 107 includes a coordination unit 121. The coordination unit 121 is configured to coordinate the motion detection based on inputs from multiple motion detectors distributed among multiple appliances. For example, the motion detector output of the smart air conditioner, the motion detector output of the smart oven, and the motion detector output of the smart refrigerator, etc. are shared among the multiple appliances, such that when motion is detected by one of the multiple devices, the coordination unit 121 on each of the multiple appliances informs its local presence detection unit 113, and which can decide whether to trigger the image capturing of the local cameras, depending on whether the motion is sufficiently close to itself (e.g., the layout of the different motion detectors are shared among the multiple appliances). In some embodiments, by utilizing the multiple motion detectors on different appliances, the motion detection can be performed early enough, such that the delay in image capturing and user interface reconfiguration is reduced to improve user experience. In some embodiments, the coordination unit 121 is configured to coordinate the image capturing from multiple cameras distributed among multiple appliances. Using the images captured by multiple devices at different angles, the chance of capturing the front side of the face is improved, which is beneficial to identity determination, and age determination. In some embodiments, the timing of the image capturing is encoded in the images, such that the movement of the user and which way the user is looking is determined based on the images captured by multiple appliances located at different positions in the room over a period of time (e.g., as the user is moving about the kitchen).

The above examples are provided merely for illustrative purposes. More details of the functions of the appliance 124 are set forth below with respect to the flowchart shown in FIG. 4.

Figure 3:
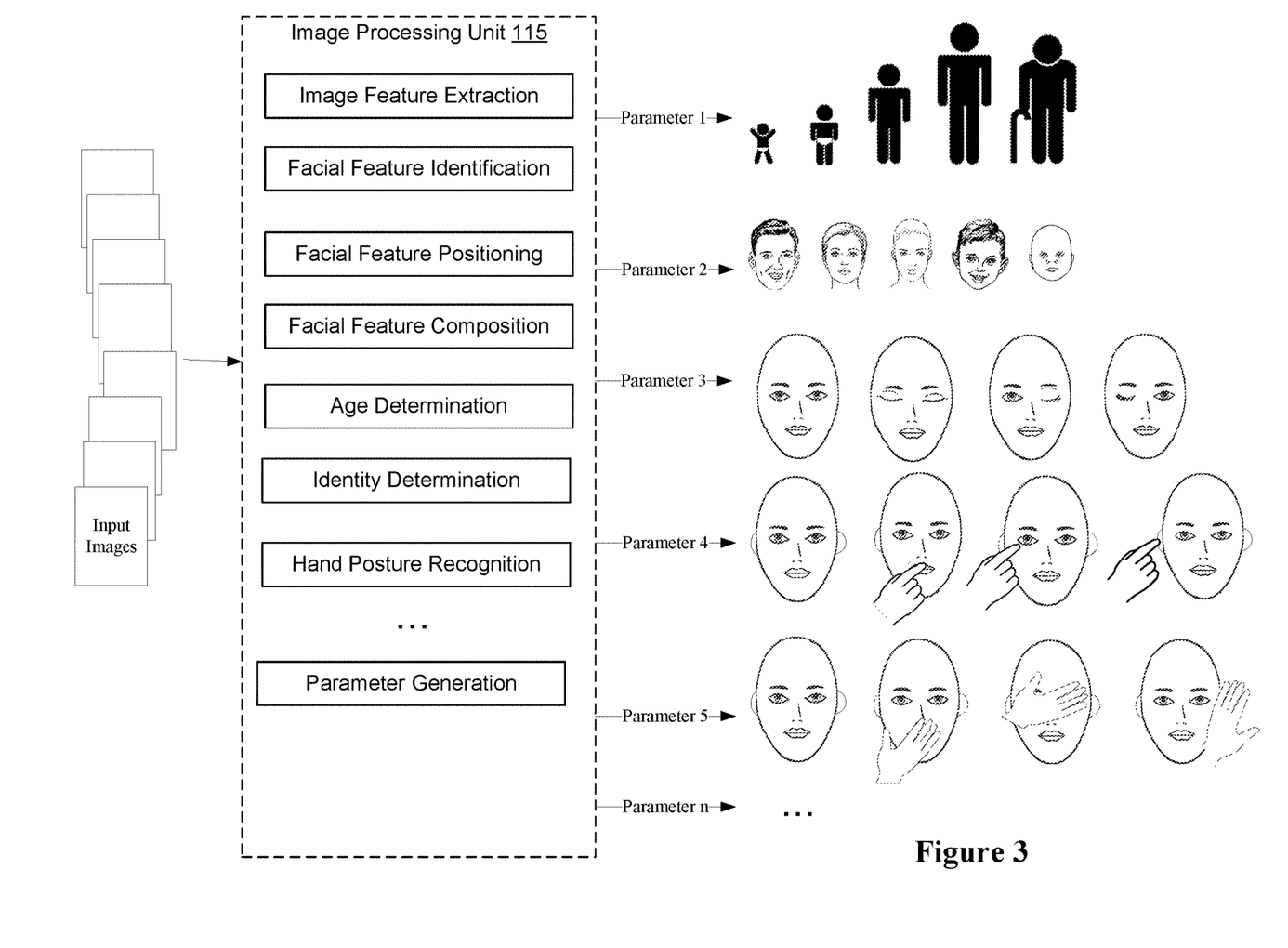
FIG. 3 illustrates various facial features that are deduced from image analysis of facial images in accordance with some embodiments.

FIG. 3 illustrates various facial features that are deduced from image analysis of facial images in accordance with some embodiments.

As shown in FIG. 3, input images to the image analysis unit 115 include facial images of users detected in the vicinity of an appliance. The image analysis unit 115 utilizes various image processing models to determine facial features present in the images. In some embodiments, age is a parameter that is output by one of the image processing models utilized by the image processing unit 115, and the resulting age group (e.g., elderly, adult, children, toddler, baby) of the user identified from the input images is used to adjust the user interface configuration of the appliance based on preconfigured correspondence between the age group and available user interface configurations. In some embodiments, user identity is a parameter that is output by one of the image processing models utilized by the image processing unit 115, and the resulting identity (e.g., Bob, Jane, Mary, Tim, and Eva) is used to adjust the user interface configuration of the appliance based on preconfigured correspondence between the user identity and available user interface configurations. In some embodiments, individual facial features are recognized from the input images using different image processing models specifically trained for respective facial features. For example, eyes, nose, ears, mouths, hands, facial accessories are individually recognized from the images using different image processing models trained to recognize each of these facial features. In some embodiments, the states of the facial features are also determined using the respective models for recognizing the facial features. For example, the state of the eye(s) is a parameter that is output by one of the image processing models utilized by the image processing unit 115, and the resulting state of the eye (e.g., fully open, fully closed, left eye open, right eye open) is used to adjust the user interface configuration of the appliance based on preconfigured correspondence between the eye state and user interface configuration. For example, the eyes closed state corresponds a user's request to provide accessibility enhancement for vision impaired users (e.g., enlarged font, activate voice over, activate speech input interface, etc.). The left eye open state corresponds to a user's request to provide a limited set of vision enhancements (e.g., turn on voice-over, but don't change the user interface appearance). The right eye open state corresponds to a user's request to provide another limited set of vision enhancements (e.g., turn off voice-over, change the user interface appearance).

In some embodiments, the position and hand posture of hand over a facial feature are also determined using the respective models for recognizing the facial features. For example, when a single finger is detected over a facial feature, a respective accessibility enhancement corresponding to the facial feature is turned on. For example, when the single finger is found over the mouth, a speech user interface is activated. When the whole hand is found over the mouth, the speech user interface is deactivated. When the single finger is found over the eye, a graphical user interface is displayed and voice input is disabled. When the whole hand is found over the eyes, the graphical user interface is disabled, and a speech user interface is activated as the primary input mode. when the single finger is found over the ear, an audio output interface is activated as the primary feedback mode. When the whole hand is found over the ear, the audio output interface is disabled.

The parameters and facial features shown in FIG. 3 are merely illustrative and the corresponding user interface configuration change is also illustrative. Other facial features, parameters, and corresponding user interface configuration changes are possible, in various embodiments.

Figure 4:
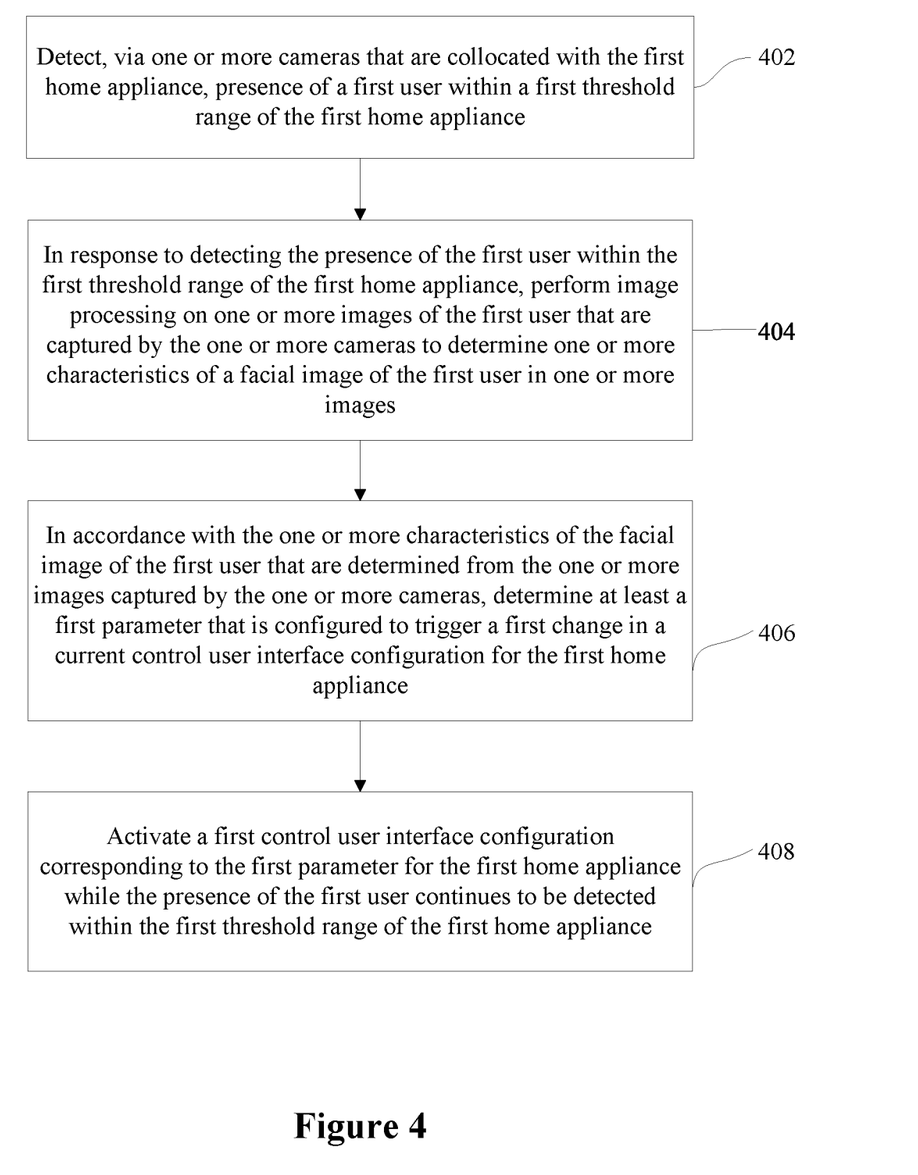
FIG. 4 is a flowchart diagram of a method of providing a user interface of a home appliance in accordance with some embodiments.

FIG. 4 is a flowchart diagram of a method 400 of providing a control user interface at a first home appliance in accordance with some embodiments. In some embodiments, the method 400 is performed by a computing system (e.g., appliance 124 or server 108) having one or more processors and memory (e.g., the computing system is a control unit of the first home appliance or a server that is communicably coupled to the first home appliance (e.g., a remote server provided by the manufacturer or third-party service provider of the first home appliance, or a server of a smart home environment)).

The computing system detects (402), via one or more cameras that are collocated with the first home appliance (e.g., the one or more cameras optionally include one or more built-in camera(s) of the first home appliance, one or more built-in camera(s) of a second home appliance that is located in the vicinity of (e.g., located in the same room, or on the same side of a room, or adjacent to each other) the first home appliance, one or more external cameras that are placed in the vicinity of the first home appliance), presence of a first user within a first threshold range (e.g., arm's length, three feet, one foot, or in the same room, etc.) of the first home appliance.

In response to detecting the presence of the first user within the first threshold range of the first home appliance, the computing system performs (404) image processing on one or more images of the first user that are captured by the one or more cameras (e.g., performing the image processing at the time that the presence of the first user is detected and/or immediately after the detection of the first user's presence) to determine one or more characteristics of a facial image of the first user in one or more images (e.g., image captured by the one or more cameras at the time). The one or more images are optionally individually captured images, or image frames of a continuously captured video. In some embodiments, the images are portions of originally captured images that include the face portion of the user. In some embodiments, the image processing on one or more images includes image processing of a video to determine motion (e.g., expressions) in the facial portions of the images.

In accordance with the one or more characteristics of the facial image (e.g., features extracted by a feature extraction neural network (e.g., a convolution neural network) and region proposal network)) of the first user that are determined from the one or more images captured by the one or more cameras, the computing system determines (406) at least a first parameter (e.g., an age, gender, identity, an intentionally blocked facial feature (e.g., hand covering mouth, hand covering ear, hand covering forehead, etc.)) that is configured to trigger a first change in a current control user interface configuration for the first home appliance.

The computing system activates (408) a first control user interface configuration corresponding to the first parameter for the first home appliance (e.g., the first control user interface configuration has a modified input mode, modified user interface layout, a different set of permitted functions, a different feedback mode, different accessibility enhancement, and/or different access restrictions from the current control user interface configuration used immediately before the presence of the first user was detected) while the presence of the first user continues to be detected within the first threshold range of the first home appliance. In some embodiments, the computing system reverts the user interface configuration of the first home appliance back to a default user interface configuration in response to detecting that the first user is no longer within the first threshold range of the first home appliance and has remained outside of the first threshold range for at least a threshold amount of time. In some embodiments, the computing system keeps the user interface configuration after the first user has left the vicinity of the first home appliance, until the computing system detects presence of another user in the vicinity of the first home appliance with characteristics for trigging a different user interface configuration.

In some embodiments, the computing system is a control unit of the first home appliance, and is physically built into the first home appliance. For example, the first home appliance is able to perform the adjustment of user interface configuration without a network connection to a remotely located server. In some embodiments, the computing system is a central control of a smart home or smart kitchen environment that includes multiple smart home appliances that are all communicably connected to the computing system.

In some embodiments, the one or more cameras are physically built into the first home appliance. For example, the first home appliance includes one or more cameras that capture images of a user when the user's presence is detected within the first threshold range of the first home appliance (e.g., within an arm's length (e.g., 50-100 centimeters) of the first home appliance, or in the same room as the first home appliance, etc.).

In some embodiments, the first home appliance includes a first motion detector and a first camera. The computing system detects the presence of the first user within the first threshold range using the first motion detector of the first home appliance; and the computing system activates an image capturing function of the first camera of the first home appliance to capture at least one of the one or more images of the first user, in response to detecting the presence of the first user within the first threshold range using the first motion detector. For example, a smart oven has a built-in motion detector that is constantly detecting motion within a threshold range of the smart oven. When motion is detected by the motion detector (e.g., the motion detector is triggered when the user walks toward the smart oven and reaches within 1 meter of the smart oven), the built-in camera of the smart oven is activated to capture a video or still image of the environment in front of the smart oven. If the user is present in front of the smart oven, the image of the user is captured in the first image or a sequence of video images captured by the camera. Using the motion detector to trigger image capturing allows the user to maintain more privacy, and reduce the power consumption due to use of the camera.

In some embodiments, the first home appliance is collocated with the second home appliance within the first threshold range, the first home appliance and the second home appliance are coupled to each other via a local area network, and the second home appliance includes a second motion detector and a second camera. The computing system detects the presence of the first user within the first threshold range using the second motion detector of the second home appliance; and the computing system activates an image capturing function of the second camera of the second home appliance to capture at least one of the one or more images of the first user, in response to detecting the presence of the first user within the first threshold range using the second motion detector. For example, a smart oven and a smart refrigerator are located next to each other in the kitchen. The oven and the refrigerator are connected to the same local area network of the house, and optionally has a central control unit for the smart home or smart kitchen environment. The smart refrigerator has a built-in motion detector that is constantly detecting motion within the first threshold range of itself, including the space around the smart oven. When motion is detected by the motion detector (e.g., the motion detector is triggered when the user walks toward the smart refrigerator, or walk past the smart refrigerator, or walks into the kitchen) of the smart refrigerator, the built-in camera of the smart refrigerator is activated to capture a video or still image of the environment within the vicinity of the smart refrigerator. If the user is present in the vicinity of the smart refrigerator, the image of the user is captured in the first image or a sequence of video images captured by the camera of the smart refrigerator.

In some embodiments, the first home appliance includes a first camera. The computing system activates an image capturing function of the first camera of the first home appliance to capture at least one of the one or more images of the first user, in response to detecting the presence of the first user within the first threshold range using the second motion detector of the second home appliance. Continue with the example above with the smart oven and the smart refrigerator, in addition to triggering the camera of the refrigerator to capture the user's image(s), the motion detector of the smart refrigerator is also configured to trigger the camera of the oven, when the user's presence is detected by the motion detector of the smart refrigerator. For example, when the user enters the kitchen, or walks past the smart refrigerator, the cameras of both the smart oven and the smart refrigerator are activated by the motion detector of the smart refrigerator. The images captured by both the smart oven and the smart refrigerator can be used to analyze the facial image of the user to determine the control user interface configurations for both the smart refrigerator and the smart oven while the user is still in the vicinity of the refrigerator and oven.

In some embodiments, the first home appliance is collocated with the second home appliance within the first threshold range, the first home appliance and the second home appliance are coupled to each other via a local area network, and the second home appliance includes a second camera. The computing system activates an image capturing function of the second camera of the second home appliance to capture at least one of the one or more images of the first user, in response to detecting the presence of the first user within the first threshold range using the first motion detector of the first home appliance. For example, a smart oven and a smart refrigerator are located next to each other in the kitchen. The oven and the refrigerator are connected to the same local area network of the house, and optionally has a central control unit for the smart home or smart kitchen environment. The smart oven has a built-in motion detector that is constantly detecting motion within the first threshold range of itself, including the space around the smart refrigerator. When motion is detected by the motion detector (e.g., the motion detector is triggered when the user walks toward the smart oven, or walk past the smart oven, or walks into the kitchen) of the smart oven, the built-in camera of the smart oven and the built-in camera of the smart refrigerator are both activated to capture videos or still images of the environment within the vicinity of themselves. The images from both appliances are used to detect features in the facial images of the user, and the results are used to control changes made to the user interface configurations of both the smart oven and the smart refrigerator. In some embodiments, the presence of the user in the vicinity of a smart appliance is detected via a wearable device on the user's body (e.g., a wrist band) that can be detected by the motion detectors of the smart appliances.

In some embodiments, performing image processing on the one or more images of the first user that are captured by the one or more cameras to determine the one or more characteristics of a facial image of the first user in the one or more images include: determining an age characteristic of the first user based on the facial image of the first user (e.g., based on a plurality of facial images found in a plurality of images captured by the cameras). In some embodiments, the age recognition is performed by a deep learning model that is trained on facial images of people of different age groups, and the facial images are categorized into two or more age categories (e.g. elderly, adult, teenager, grade school children, toddler, baby) with different accessibility enhancement needs and/or access restriction needs. In some embodiments, the training images used to train the deep learning model do not include images of the first user. For example, the home appliance is optionally a laundry machine or vending machine in a public venue, and the first user can be a member of the public that visits the public venue. In some embodiments, the age recognition is performed by a deep learning model that is trained on facial images of one or more household members of a household, and the facial images are categorized into two or more age categories (e.g. elderly, adult, teenager, grade school children, toddler, baby) with different accessibility enhancement needs and/or access restriction needs. For a household, grandparents may need enhanced accessibility for the control user interface of various home appliances, due to poor eye-sight, poor hand-eye coordination, weaker strength and/or understanding of complex and new features. A teenager may need a first type of access control that restricts risky or irresponsible uses of various home appliances. Grade school children may need enhanced guidance during usage of certain home appliances. A toddler may need restriction to only a small set of safe functions of the home appliances and also accessibility enhancement for those allowed functions. A baby is prevented to trigger any action even if the user interface is provided for pure entertainment purposes to the baby (e.g., baby may enjoy playing with a control panel and hear the beeps and see the colored text light up on control panel).

In some embodiments, performing image processing on the one or more images of the first user that are captured by the one or more cameras to determine the one or more characteristics of a facial image of the first user in the one or more images include: determining an identity characteristic of the first user based on the one or more facial images of the first user. In some embodiments, the identity recognition is performed by a deep learning model that is trained on facial images of one or more household members of a household, and the facial images are linked to individual persons in the household (e.g. grandma, grandpa, mother, father, oldest son, middle son, youngest daughter, etc.) with different accessibility enhancement needs and/or access restriction needs. For an example, in the household, grandma may need enhanced accessibility for the control user interface of various home appliances, due to poor eye-sight, poor hand-eye coordination, weaker strength and/ or understanding of complex and new features. Grandpa may need restriction on access to various functions of certain appliances, due to reduced cognitive functions and judgement caused by dementia. The oldest son may need a first type of access control that restricts risky or irresponsible uses of various home appliances. The middle son may need enhanced guidance during usage of certain home appliances. The youngest daughter may need restriction to only a small set of safe functions of the home appliances and also accessibility enhancement for those allowed functions. The accessibility enhancement and access restriction applied to different types of appliance may be different, based on characteristics that are not necessarily based on the age of the people. For example, the middle child may need restricted access to the refrigerator due to his tendency to overeat when unsupervised, the restriction is not based on age but based on the child's identity. In another example, the youngest daughter may need enhanced accessibility to the air conditioner (e.g., she is too short to reach the AC remote controller usually placed on the countertop), and needs to automatically activate a motion gesture-based or voice-based control interface when he/she is standing in front of the air conditioner. This enhanced accessibility is not due to his/her age or cognitive immaturity, but rather other due to other characteristics unique to her.

In some embodiments, performing image processing on the one or more images of the first user that are captured by the one or more cameras to determine the one or more characteristics of a facial image of the first user in the one or more images include: determining whether a predefined portion of the facial image is blocked by a predefined object based on the one or more facial images of the first user. For example, in some embodiments, the first user may wish to activate certain accessibility enhancement(s) or access restrictions on the fly, even if the user's age and/or identity is associated with other accessibility enhancement(s) and/or access restrictions for the first home appliance. For example, the adult parent of the household is usually provided with a first user interface configuration that uses voice command as the primary means of input, and touch inputs are usually turned off until the user specifically turns on the display of the first home appliance. In an example scenario, if the user has a sore throat and does not want to speak, or if the user does not want to wake a sleeping family member, the user can walk to the first appliance and covers his/her mouth in front of the camera of the first appliance. When the computing system detects that there is a hand in front of the mouth portion of the user's face in the facial image of the first user, the computing system alters an existing user interface configuration to disable voice input interface, and displays a graphical user interface with touch input detection capabilities. This facial image analysis-based change in user interface configuration (e.g., preferred input mode, display configuration change (e.g., layout, font, color, etc.), preferred feedback mode, restricted functions, etc.) is faster, convenient, and more intuitive to the user.

In some embodiments, in an example, the first user has poor eyesight, and is usually associated with a user interface configuration with visual accessibility enhancements (e.g., large fonts, reduced user interface complexity, larger buttons, higher contrasts, voice-over, etc.). These enhanced accessibility features are useful for the first user usually, and are turned on when the computing system determines that the first user is present near the first home appliance, and does not have her glasses on. There accessibility enhancements are useful when the user does not have her glasses on, but would be annoying and distracting if the user has glasses on and does not need the enhancements. So, in some embodiments, when the computing system detects that the first user is wearing glasses over his/her eyes based on the image analysis, the computing system alters the usual user interface configuration associated with the first user to remove the visual accessibility enhancement features and displays a graphical user interface with regular layout (e.g., regular font size and contrast, and optionally with more options included in the user interface) and feedback mechanisms (voice-over is turned off). This facial image analysis-based change in user interface configuration (e.g., preferred input mode, display configuration change (e.g., layout, font, color, etc.), preferred feedback mode, restricted functions, etc.) is faster, convenient, and more intuitive to the user.

In another example, the adult parent of the household wears contact lenses and is usually provided with a first user interface configuration without visual accessibility enhancement. If the user happens to not wear contact lens or glasses one day, the computing system will not be able to tell the difference from an unblocked facial image of the user. The user has the option to cover her eyes when her images are captured by the cameras of the first home appliance. When the computing system detects that there is a hand in front of the eye portion of the user's face in the facial image of the first user, the computing system alters an existing user interface configuration to enable a voice input interface and/or displays a graphical user interface with enhanced visual accessibility features (e.g., larger font, higher contrast, fewer options and larger buttons, enable voice-over, etc.). This facial image analysis-based change in user interface configuration (e.g., preferred input mode, display configuration change (e.g., layout, font, color, etc.), preferred feedback mode, restricted functions, etc.) is faster, convenient, and more intuitive to the user.

In another example, the adult parent of the household usually prefers audio-based feedback when interacting with the first home appliance. If the user does not wish to wake a sleeping family member or disturb others in the household, the user has the option to cover her ears when her images are captured by the cameras of the first home appliance. When the computing system detects that there is a hand in the ear portion of the user's face in the facial image of the first user, the computing system alters an existing user interface configuration to disable audio feedback of the first home appliance, and uses alternative feedback mechanisms of the first home appliance (e.g., displays feedback or provide haptic feedback on the first home appliance). This facial image analysis-based change in user interface configuration (e.g., preferred input mode, display configuration change (e.g., layout, font, color, etc.), preferred feedback mode, restricted functions, etc.) is faster, convenient, and more intuitive to the user.

In another example, the adult parent of the household usually prefers to operate the first home appliance with a touch-input user interface. If the user's hands happen to be contaminated (e.g., with grease or other substance that the user does not wish to get onto the first home appliance), the user has the option to activate other modes of input on the fly. For example, the user can stand in front of the camera of the first home appliance and cross his hands in front of his chest or face. If the computing system detects that there are two hands in front of the user's face in the facial image of the first user, the computing system activates a voice-based or motion-gesture based input system of the first home appliance, such that the user can control the first home appliance using voice commands or motion gestures (e.g., movement of the user's hands without touching any input surfaces) performed by the user.

In some embodiments, the on-the-fly changes or customization made to the user interface configuration of the first home appliance (e.g., preferred input mode, display configuration change (e.g., layout, font, color, etc.), preferred feedback mode, restricted functions) is useful for appliances installed in public places, where people with different types of input preferences, disabilities, accessibly needs, and feedback preferences may use the same appliance. By capturing the user's preferences through analysis of their facial images and allowing them to provide a hand position input over their faces greatly improves the flexibility of the appliances and enhances user experience without expensive hardware alterations.

In some embodiments, activating the first control user interface configuration corresponding to the first parameter for the first home appliance includes: changing a primary input mode of the first home appliance from a first primary input mode to a second primary input mode that is distinct from the first primary input mode.

In some embodiments, activating the first control user interface configuration corresponding to the first parameter for the first home appliance includes: changing a graphical user interface layout of the first home appliance from a first graphical user interface layout to a second graphical user interface layout that is distinct from the first graphical user interface layout.

In some embodiments, activating the first control user interface configuration corresponding to the first parameter for the first home appliance includes: changing a set of permitted functions available on the first home appliance from a first set of permitted functions to a second set of permitted functions that is distinct from the first set of permitted functions.

In some embodiments, activating the first control user interface configuration corresponding to the first parameter for the first home appliance includes: changing a primary feedback mode of the first home appliance from a first feedback mode to a second feedback mode that is distinct from the first feedback mode.

In some embodiments, activating the first control user interface configuration corresponding to the first parameter for the first home appliance includes: changing a set of active accessibility enhancement features of a current control user interface configuration used before the presence of the first user was detected.

In some embodiments, the first parameter includes one or more of a user's age group and a user's identity.

The method of claim 1, wherein the first parameter includes one of a hand or object blocking of one of an eye portion of the first user's face, an ear portion of the first user's face, a mouth portion of the first user's face, or a nose portion of the user's face (e.g., by two hands, or the user's index finger).

In some embodiments, while performing image processing on the one or more images of the first user that are captured by the one or more cameras, the computing system detects that the one or more images include facial images of a second user that is distinct from the first user; the computing system determines one or more characteristics of a facial image of the second user in the one or more images; and in accordance with the one or more characteristics of the facial image of the second user that are determined from the one or more images captured by the one or more cameras, the computing system determines at least a second parameter that is configured to trigger a second change that is distinct from the first change in the current control user interface configuration for the first home appliance, wherein: activating the first control user interface configuration corresponding to the first parameter for the first home appliance is performed in accordance with at least one of a first condition that the first change and the second change to the first current control user interface configuration are compatible changes with each other, or a second condition that the first user has a higher priority setting than the second user (e.g., the first user is an adult and the second user is a child, or the first user is a caregiver and the second user is an elderly patient that is being helped by the first user), being met.

It should be understood that the particular order in which the operations in FIG. 4 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods and/or processes described herein are also applicable in an analogous manner to method 300 described above.

Figure 5:
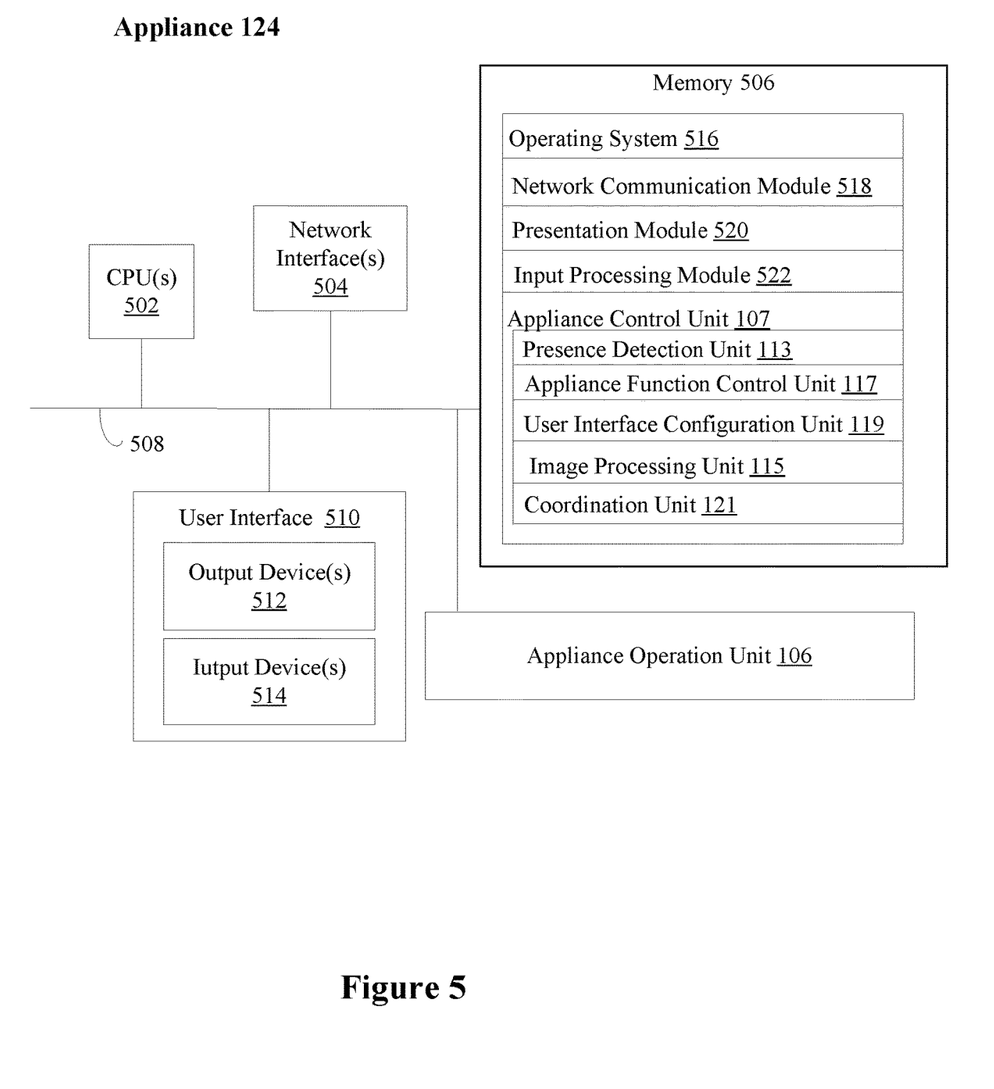
FIG. 5 is a block diagram of a computing system in accordance with some embodiments.

FIG. 5 is a block diagram illustrating a representative appliance 124. The appliance 124 includes one or more processing units (CPUs) 502, one or more network interfaces 504, memory 506, and one or more communication buses 508 for interconnecting these components (sometimes called a chipset). Appliance 124 also includes a user interface 510. User interface 510 includes one or more output devices 512 that enable presentation of media content, including one or more speakers and/or one or more visual displays. User interface 510 also includes one or more input devices 514, including user interface components that facilitate user input such as a keyboard, a mouse, a voice-command input unit or microphone, a touch screen display, a touch-sensitive input pad, a gesture capturing camera, or other input buttons or controls. In some embodiments, appliance 124 further includes sensors, which senses operating environment information of the appliance 124. Sensors include but are not limited to one or more microphones, one or more cameras, an ambient light sensor, one or more accelerometers, one or more gyroscopes, a GPS positioning system, a Bluetooth or BLE system, a temperature sensor, humidity sensors, one or more motion sensors, one or more biological sensors (e.g., a galvanic skin resistance sensor, a pulse oximeter, and the like), and other sensors. Furthermore, the appliance 124 includes appliance operation unit 106. Memory 506 includes high-speed random access memory, such as DRAM, SRAM, DDR RAM, or other random access solid-state memory devices; and, optionally, includes non-volatile memory, such as one or more magnetic disk storage devices, one or more optical disk storage devices, one or more flash memory devices, or one or more other non-volatile solid state storage devices. Memory 506, optionally, includes one or more storage devices remotely located from one or more processing units 502. Memory 506, or alternatively the non-volatile memory within memory 506, includes a non-transitory computer readable storage medium. In some implementations, memory 506, or the non-transitory computer readable storage medium of memory 506, stores the following programs, modules, and data structures, or a subset or superset thereof:

operating system 516 including procedures for handling various basic system services and for performing hardware dependent tasks;

network communication module 518 for connecting appliance 124 to other computing devices (e.g., a server system 108) or mobile control devices (e.g., smart phones or tablets) connected to one or more networks via one or more network interfaces 504 (wired or wireless);

presentation module 520 for enabling presentation of information;
input processing module 522 for detecting one or more user inputs or interactions from one of the one or more input devices 514 and interpreting the detected input or interaction;
appliance control unit 107, which controls the appliance 124, including but not limited to presence detection unit 113, appliance function control unit 117, image processing unit 115, user interface configuration unit 119, and coordination unit 121, and other modules for performing other functions set forth herein.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 506, optionally, stores a subset of the modules and data structures identified above. Furthermore, memory 506, optionally, stores additional modules and data structures not described above.

While particular embodiments are described above, it will be understood it is not intended to limit the application to these particular embodiments. On the contrary, the application includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

What is claimed is:

1. A method of providing a control user interface at a first home appliance, comprising:
at a computing system having one or more processors and memory:
detecting, via one or more cameras that are collocated with the first home appliance, presence of a first user within a first threshold range of the first home appliance;
in response to detecting the presence of the first user within the first threshold range of the first home appliance, performing image processing on one or more images of the first user that are captured by the one or more cameras to determine one or more characteristics of a facial image of the first user in one or more images including determining whether a predefined portion of the facial image is blocked by a predefined object based on the one or more facial images of the first user;
in accordance with the one or more characteristics of the facial image of the first user that are determined from the one or more images captured by the one or more cameras determining at least a first parameter that is configured to trigger a first change in a current control user interface configuration for the first home appliance;
in accordance with a determination that the predefined portion of the facial image is blocked, modifying an existing user interface configuration; and
activating a first control user interface configuration corresponding to the first parameter for the first home appliance while the presence of the first user continues to be detected within the first threshold range of the first home appliance, wherein the predefined object comprises at least a portion of a hand of the first user and modifying the existing user interface configuration comprises disabling a first input interface from accepting input from the first user of a first input type and activating a second input interface to accept input from the first user of a second input type different from the first input type, and wherein the first input type is one of speech, touch, or gesture.

2. The method of claim 1, wherein the first home appliance includes a first motion detector hardware device and a first camera, and the method includes:
detecting the presence of the first user within the first threshold range using the first motion detector hardware device of the first home appliance; and
activating an image capturing function of the first camera of the first home appliance to capture at least one of the one or more images of the first user, in response to detecting the presence of the first user within the first threshold range using the first motion detector hardware device.

3. The method of claim 1, wherein performing image processing on the one or more images of the first user that are captured by the one or more cameras to determine the one or more characteristics of a facial image of the first user in the one or more images include:
determining an age characteristic of the first user based on the facial image of the first user.

4. The method of claim 1, wherein performing image processing on the one or more images of the first user that are captured by the one or more cameras to determine the one or more characteristics of a facial image of the first user in the one or more images include:
determining an identity characteristic of the first user based on the one or more facial images of the first user.

5. The method of claim 1, wherein activating the first control user interface configuration corresponding to the first parameter for the first home appliance includes:
changing a primary input mode of the first home appliance from a first primary input mode to a second primary input mode that is distinct from the first primary input mode.

6. The method of claim 1, wherein activating the first control user interface configuration corresponding to the first parameter for the first home appliance includes:
changing a graphical user interface layout of the first home appliance from a first graphical user interface layout to a second graphical user interface layout that is distinct from the first graphical user interface layout.

7. The method of claim 1, wherein activating the first control user interface configuration corresponding to the first parameter for the first home appliance includes:
changing a set of permitted functions available on the first home appliance from a first set of permitted functions to a second set of permitted functions that is distinct from the first set of permitted functions.

8. The method of claim 1, wherein activating the first control user interface configuration corresponding to the first parameter for the first home appliance includes:
changing a primary feedback mode of the first home appliance from a first feedback mode to a second feedback mode that is distinct from the first feedback mode, wherein the second feedback mode comprises an audio output interface.

9. The method of claim 1, wherein the predefined object comprises at least a portion of a hand of the first user and modifying the existing user interface configuration comprises activating a voice-based or motion-gesture based input system of the first home appliance.

10. A non-transitory computer-readable storage medium storing instructions, the instructions, when executed by one or more processors of a computing system that is communicably coupled to a first home appliance, cause the processors to perform operations comprising:
  detecting, via one or more cameras that are collocated with the first home appliance, presence of a first user within a first threshold range of the first home appliance;
  in response to detecting the presence of the first user within the first threshold range of the first home appliance, performing image processing on one or more images of the first user that are captured by the one or more cameras to determine one or more characteristics of a facial image of the first user in one or more images including determining whether a predefined portion of the facial image is blocked by a predefined object based on the one or more facial images of the first user;
  in accordance with the one or more characteristics of the facial image of the first user that are determined from the one or more images captured by the one or more cameras, determining at least a first parameter that is configured to trigger a first change in a current control user interface configuration for the first home appliance;
  in accordance with a determination that the predefined portion of the facial image is blocked, modifying an existing user interface configuration; and
  activating a first control user interface configuration corresponding to the first parameter for the first home appliance while the presence of the first user continues to be detected within the first threshold range of the first home appliance, wherein the predefined object comprises at least a portion of a hand of the first user and modifying the existing user interface configuration comprises disabling a first input interface from accepting input from the first user of a first input type and activating a second input interface to accept input from the first user of a second input type different from the first input type, and wherein the first input type is one of speech, touch, or gesture.

11. The non-transitory computer-readable storage medium of claim 10, wherein the first home appliance includes a first motion detector hardware device and a first camera, and the operations include:
  detecting the presence of the first user within the first threshold range using the first motion detector hardware device of the first home appliance; and
  activating an image capturing function of the first camera of the first home appliance to capture at least one of the one or more images of the first user, in response to detecting the presence of the first user within the first threshold range using the first motion detector hardware device.

12. The non-transitory computer-readable storage medium of claim 10, wherein performing image processing on the one or more images of the first user that are captured by the one or more cameras to determine the one or more characteristics of a facial image of the first user in the one or more images include:
  determining an age characteristic of the first user based on the facial image of the first user.

13. The non-transitory computer-readable storage medium of claim 10, wherein performing image processing on the one or more images of the first user that are captured by the one or more cameras to determine the one or more characteristics of a facial image of the first user in the one or more images include:
  determining an identity characteristic of the first user based on the one or more facial images of the first user.

14. A computing system that is configured to be coupled to a first home appliance, comprising:
  one or more processors; and
  memory storing instructions, the instructions, when executed by the one or more processors, cause the processors to perform operations comprising:
    detecting, via one or more cameras that are collocated with the first home appliance, presence of a first user within a first threshold range of the first home appliance;
    in response to detecting the presence of the first user within the first threshold range of the first home appliance, performing image processing on one or more images of the first user that are captured by the one or more cameras to determine one or more characteristics of a facial image of the first user in one or more images including determining whether a predefined portion of the facial image is blocked by a predefined object based on the one or more facial images of the first user;
    in accordance with the one or more characteristics of the facial image of the first user that are determined from the one or more images captured by the one or more cameras, determining at least a first parameter that is configured to trigger a first change in a current control user interface configuration for the first home appliance;
    in accordance with a determination that the predefined portion of the facial image is blocked, modifying an existing user interface configuration; and
  activating a first control user interface configuration corresponding to the first parameter for the first home appliance while the presence of the first user continues to be detected within the first threshold range of the first home appliance, wherein the predefined object comprises at least a portion of a hand of the first user and modifying the existing user interface configuration comprises disabling a first input interface from accepting input from the first user of a first input type and activating a second input interface to accept input from the first user of a second input type different from the first input type, and wherein the first input type is one of speech, touch, or gesture.

15. The computing system of claim 14, wherein the first home appliance includes a first motion detector hardware device and a first camera, and the operations include:
  detecting the presence of the first user within the first threshold range using the first motion detector hardware device of the first home appliance; and
  activating an image capturing function of the first camera of the first home appliance to capture at least one of the one or more images of the first user, in response to detecting the presence of the first user within the first threshold range using the first motion detector hardware device.

16. The computing system of claim 14, wherein performing image processing on the one or more images of the first user that are captured by the one or more cameras to determine the one or more characteristics of a facial image of the first user in the one or more images include:
   determining an age characteristic of the first user based on the facial image of the first user.

17. The computing system of claim 14, wherein performing image processing on the one or more images of the first user that are captured by the one or more cameras to determine the one or more characteristics of a facial image of the first user in the one or more images include:
   determining an identity characteristic of the first user based on the one or more facial images of the first user.

\* \* \* \* \*